Patented Dec. 24, 1929

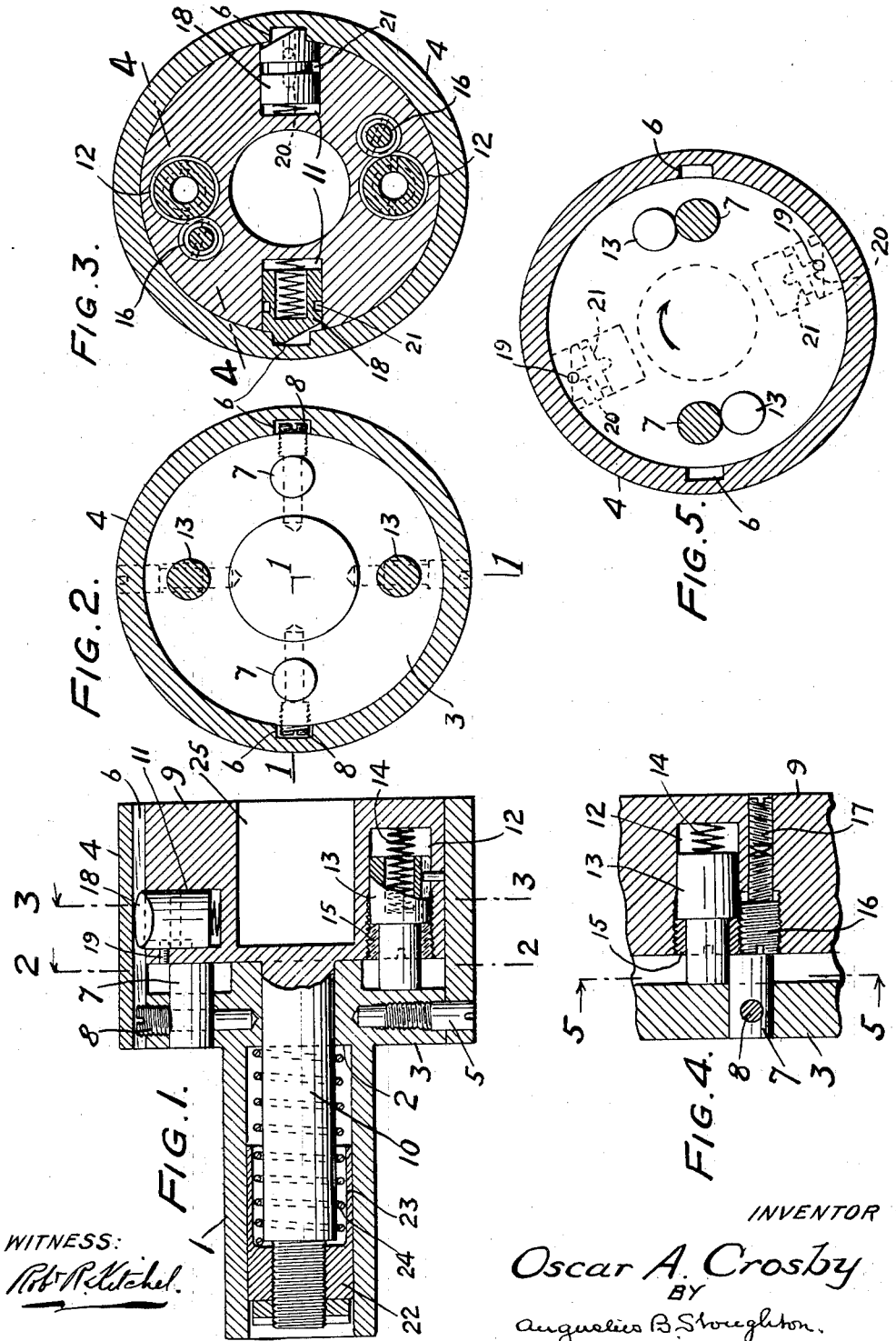

1,740,887

UNITED STATES PATENT OFFICE

OSCAR A. CROSBY, OF PHILADELPHIA, PENNSYLVANIA

TAP AND DIE HOLDER

Application filed March 9, 1926. Serial No. 93,373.

Objects of the present invention are to facilitate the manufacture and assembly of the parts of the holder; to provide a holder that will insure extreme accuracy in the length of thread cut; to provide for the use of the holder either right or lefthand; to improve and make more reliable the operation of the parts of the device; and to provide a durable tap and die holder adapted to do the work required with certainty and precision.

Other objects of the invention will appear from the following description at the end of which the invention will be claimed and in that description reference will be made to the accompanying drawing forming part hereof and in which Figure 1 is a longitudinal sectional view of a tap and die holder taken on the line 1—1 of Fig. 2.

Fig. 2 is a sectional view taken on the line 2—2 of Fig. 1.

Fig 3 is a sectional view taken on the line 3—3 of Fig. 1.

Fig. 4 is a sectional view taken on the line 4—4 of Fig. 3, and

Fig. 5 is a sectional view taken on the line 5—5 of Fig. 4.

Referring to the drawing, 1 is a tubular stem having two dimensions of bore providing a shoulder 2. This stem 1 is provided with a circular flange 3. 4 is a cylindrical shell detachably mounted on the flange 3 by means of screws 5 and internally provided with lengthwise ranging grooves 6. 7 are driving pins, of which two are shown, arranged through apertures provided in the flange 3. 8 are screws penetrating openings provided in the pins 7 and having their heads accommodated in the grooves. The parts which have been described may be said to constitute a tubular housing having a cup like portion internally provided with lengthwise ranging driving pins 7 and grooves 6 and also provided with a shoulder 2.

9 is a head having a solid spindle 10 arranged through the tubular portion of the stem 1 for endwise and rotary motion. The head is provided with radially ranging sockets 11, Fig. 3, of which two are shown, and with lengthwise ranging sockets 12 of which two are shown, Fig. 4. In the sockets 12 are mounted headed driving pins 13. These pins are pressed by springs 14 so that their heads bear upon threaded plugs 15. The extent to which the pins 13 project from the rear of the head 9 determines the interval at which the pins 13 disengage the pins 7, permitting the head 9 theretofore driven with the tubular housing, to turn freely in respect to it, therefore it is important to provide not only accurate but also reliable adjustment for the pins 13. The screw plug 15 provides the adjustment and the lock screw 16 of which the threads in part engage with the threads of the plug 15, insure that the plug 15 will not accidentally turn. The screw 17 is a jam screw for the screw 16. 18 are spring pressed pawls mounted in the sockets 11 and they cooperate with the grooves 6 to permit the head 9 to turn freely in the housing in one direction but not in the other direction. There are pins 19, Fig. 1, which work in lengthwise grooves 20 in the pawls to prevent rotation of the latter, but circumferential grooves 21 in the pawls intersecting with the grooves 20 provide for the manual reversal of the pawls when the sleeve 4 is removed so as to make the pawls operative either in right or lefthand direction.

The parts last described comprise a second housing concentrically mounted in the tubular housing and spring pressed in respect thereto, and the second housing has adjustable driving pin and pawl connections with the tubular housing.

On the spindle 10 there is mounted a cap 22 provided with a skirt 23 encircling the spring 24, and it is useful as a support or housing for the turns of the spring when the spindle 10 is rotating. The spring 24 operates to position the parts as shown in Fig. 1.

In use a tap or die mounted in the cavity 25, so long as there is relative rotation between the tap or die and the work, produces endwise relative movement of the inner and outer housings. The outer housing, by the spindle 1, may be held fixedly and the thread as it is cut on the rotating work by the die or tap causes the inner housing to move out of the outer housing with the die or tap.

The relative rotation of the tap or die and the work is supposed to cease when the thread is of the desired length. However, that relative motion sometimes continues and when it does the pins having cleared each other the pawls 18, riding idly in respect to the grooves 6, permit freedom of rotary motion between the parts 4 and 9. The part 9 rotating with the work, upon completion of the work of the tap or die the direction of rotation of the work is reversed and the pawls 18 engage the grooves 6, preventing relative rotation of the parts 4 and 9, so that the work is withdrawn from the tap or die.

It will be obvious to those skilled in the art to which the invention relates that modifications may be made in details of construction and arrangement and in matters of mere form without departing from the spirit of the invention which is not limited to such matters or otherwise than the prior art and the appended claims may require.

I claim:

1. A thread cutting tool holder including a housing having a flange and a detachable grooved shell, driving pins projecting from the flange, and radial screws locking the pins and of which the heads occupy the grooves in the shell to facilitate assembly and disassembly and to protect the heads of the screws.

2. A thread cutting tool holder including relatively turnable and endwise movable nested housings, a driving pin on one of said housings, a spring pressed headed pin mounted in a socket provided in the other housing said pins adapted to rotatably disconnect said housings by relative endwise movement thereof, a screw plug arranged in the socket for adjusting the degree of projection of the spring pressed pin for accurate disconnection of the housing, a lock screw for the plug, and a jam screw for the lock screw.

OSCAR A. CROSBY.